United States Patent
Baker et al.

(10) Patent No.: US 9,883,461 B2
(45) Date of Patent: *Jan. 30, 2018

(54) POWER RAMPING FOR RACH

(71) Applicant: KONINKLIJKE PHILIPS N.V., Eindhoven (NL)

(72) Inventors: Matthew P. J. Baker, Canterbury (GB); Timothy J. Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,618

(22) Filed: Jul. 13, 2015

(65) Prior Publication Data

US 2015/0319704 A1 Nov. 5, 2015

Related U.S. Application Data

(63) Continuation of application No. 13/657,901, filed on Oct. 23, 2012, now Pat. No. 9,084,212, which is a (Continued)

(30) Foreign Application Priority Data

Nov. 1, 2007 (EP) .................................. 07119836

(51) Int. Cl.
*H04L 1/00* (2006.01)
*H04W 52/16* (2009.01)
(Continued)

(52) U.S. Cl.
CPC ........... *H04W 52/16* (2013.01); *H04W 52/04* (2013.01); *H04W 52/50* (2013.01); *H04W 74/08* (2013.01);
(Continued)

(58) Field of Classification Search
CPC ..... H04W 52/04; H04B 7/0689; H04L 1/0001
(Continued)

(56) References Cited

U.S. PATENT DOCUMENTS 8,320,318 B2* 11/2012 Baker .................. H04W 52/50
370/329
9,084,212 B2* 7/2015 Baker .................. H04W 52/50
(Continued)

FOREIGN PATENT DOCUMENTS

EP 1198076 A1 4/2002
GB 2346779 A 8/2000
(Continued)

OTHER PUBLICATIONS

Nokia, Nokia Siemens Networks: "Resource Assignment for E-DCH Access in Cell_Fach State", 3GPP TSG-RAN WG1 Meeting #50-BISM R1-074303M Oct. 8, 2007, Retrieved From the Internet: URL: www.3GPP.org>, 5 Page Document.
(Continued)

*Primary Examiner* — Xavier Szeawi Wong

(57) ABSTRACT

The present invention relates to a method for requesting access to a resource, the method comprising a secondary station transmitting an access preamble to a primary station, upon failure of correct transmission of the access preamble, the secondary station starting a first power ramping scheme for transmitting the access preamble, upon failure of correct transmission of the access preamble with the first power ramping scheme, wherein the second power ramping scheme comprises transmission in at least one access slot different to that used for transmission of the first access preamble.

21 Claims, 1 Drawing Sheet

Related U.S. Application Data continuation of application No. 12/739,417, filed as application No. PCT/IB2008/054445 on Oct. 28, 2008, now Pat. No. 8,320,318.

(51) Int. Cl.
  *H04W 52/04* (2009.01)
  *H04W 52/50* (2009.01)
  *H04W 74/08* (2009.01)
  *H04B 7/06* (2006.01)
  *H04W 52/36* (2009.01)

(52) U.S. Cl.
  CPC .......... *H04B 7/0689* (2013.01); *H04L 1/0001* (2013.01); *H04W 52/362* (2013.01)

(58) Field of Classification Search
  USPC .................................................. 370/329–338
  See application file for complete search history.

(56) References Cited

U.S. PATENT DOCUMENTS

| | | | |
|---|---|---|---|
| 9,137,822 B2* | 9/2015 | Sutivong | ............... H04L 1/1692 |
| 2004/0082357 A1 | 4/2004 | Moulsley et al. | |
| 2004/0082358 A1 | 4/2004 | Moulsley et al. | |
| 2005/0143118 A1* | 6/2005 | Bernhardsson | ....... H04W 52/14 |
| | | | 455/522 |
| 2006/0018289 A1 | 1/2006 | Schulist et al. | |
| 2007/0115872 A1 | 5/2007 | Kim et al. | |
| 2007/0140178 A1* | 6/2007 | Jung | .................... H04L 1/1671 |
| | | | 370/335 |
| 2007/0149235 A1 | 6/2007 | Chin et al. | |

FOREIGN PATENT DOCUMENTS

| | | |
|---|---|---|
| JP | 2006287489 A | 10/2006 |
| WO | 2004100565 A2 | 11/2004 |
| WO | 2007024101 A1 | 3/2007 |

OTHER PUBLICATIONS

Philips: "Enhanced Uplink for Cell_Fach", 3GPP TSG-RAN WGI Meeting #51, R1-074976, Nov. 5, 2007, Retrieved From the Internet: URL: www.3gpp.org>, 3 Page Document.

\* cited by examiner

POWER RAMPING FOR RACH

CLAIM OF PRIORITY

The present application is a continuation of U.S. patent application Ser. No. 13/657901, filed Oct. 23, 2012, which is a continuation of U.S. patent application Ser. No. 12/739,417, filed on Apr. 23, 2010, which was the National Stage of International Application No. PCT/IB2008/054445 filed on Oct. 28, 2008, each of which are incorporated by reference herein in their entirety.

FIELD OF THE INVENTION

This invention relates to a method of gaining access to resources of a channel, like a RACH, and to a secondary station carrying out the method of the invention, like a mobile station in a mobile telecommunication system. More specifically, the invention relates to a configurable shortened power ramping procedure.

BACKGROUND OF THE INVENTION

In UMTS WCDMA there is a mechanism defined for Random Access transmission in the uplink. The UE (User Equipment or mobile station) transmits a randomly-selected preamble signal characterised by the following parameters:
Signature sequence (i.e. bit sequence),
Scrambling code,
Sub-channel (i.e. timing of the access slot in the frame).
If the base station receives the signature, it acknowledges it on the Acquisition Indicator Channel (AICH) with a corresponding signature. If the UE receives a positive acknowledgement it transmits a message part on a RACH data channel.

If the UE does not receive an acknowledgement after transmitting the preamble signal, it can retransmit with a higher power using a procedure known as power ramping, usually comprising increasing power in predetermined steps.

If the UE still does not receive an acknowledgement after a number of steps (or receives a negative acknowledgement indicated by an inverted signature on the AICH) it can make another attempt following a further random selection of the above parameters.

If two or more UEs select the same signature and scrambling code in the same access slot, a collision occurs, and one or more of the UEs will have to restart the access procedure. The probability of collision depends on the number of Signature sequences, Scrambling codes, Access slots from which the UEs make their selection for the randomly-selected preamble signal.

According to known procedures, if a UE receives a NACK or a collision occurs, it has to start the power ramping procedure again from the beginning with the next-selected preamble. Typically the initial transmit power is quite low, usually derived from an open-loop power estimate, and repeating the ramping procedure can result in significant delay for the UE to access the network.

SUMMARY OF THE INVENTION

It is an object of the present invention to propose a method enabling a quicker random access scheme.

It is another object of the invention to propose a method of random access which is more configurable.

In accordance with a first aspect of the invention, a method is proposed for requesting access to a resource, said method comprising a secondary station transmitting an access preamble to a primary station, upon failure of correct transmission of the access preamble, the secondary station starting a first power ramping scheme for transmitting the access preamble, upon failure of correct transmission of the access preamble with the first power ramping scheme, the secondary station transmitting a second access preamble with a second power ramping scheme being different than the first power ramping scheme.

In accordance to a second aspect of the invention, it is proposed a secondary station comprising requesting means for requesting access to a resource, said requesting means comprising means for transmitting an access preamble to a primary station, said requesting means being arranged for, upon failure of correct transmission of the access preamble, starting a first power ramping scheme for transmitting the access preamble, and for, upon failure of correct transmission of the access preamble with the first power ramping scheme, transmitting a second access preamble with a second power ramping scheme being different from the first power ramping scheme.

According to the present invention, if one or both of a collision occurs or the UE receives a NACK, the UE reselects a new preamble signal (combination of signature and/or scrambling code and/or access slot) and transmits it using a simplified preamble transmission procedure. This has the advantage of reducing access delay.

These and other aspects of the invention will be apparent from and will be elucidated with reference to the embodiments described hereinafter.

BRIEF DESCRIPTION OF THE DRAWING

The present invention will now be described in more detail, by way of example, with reference to the accompanying drawing, wherein.

DETAILED DESCRIPTION OF THE INVENTION

Figure 1:
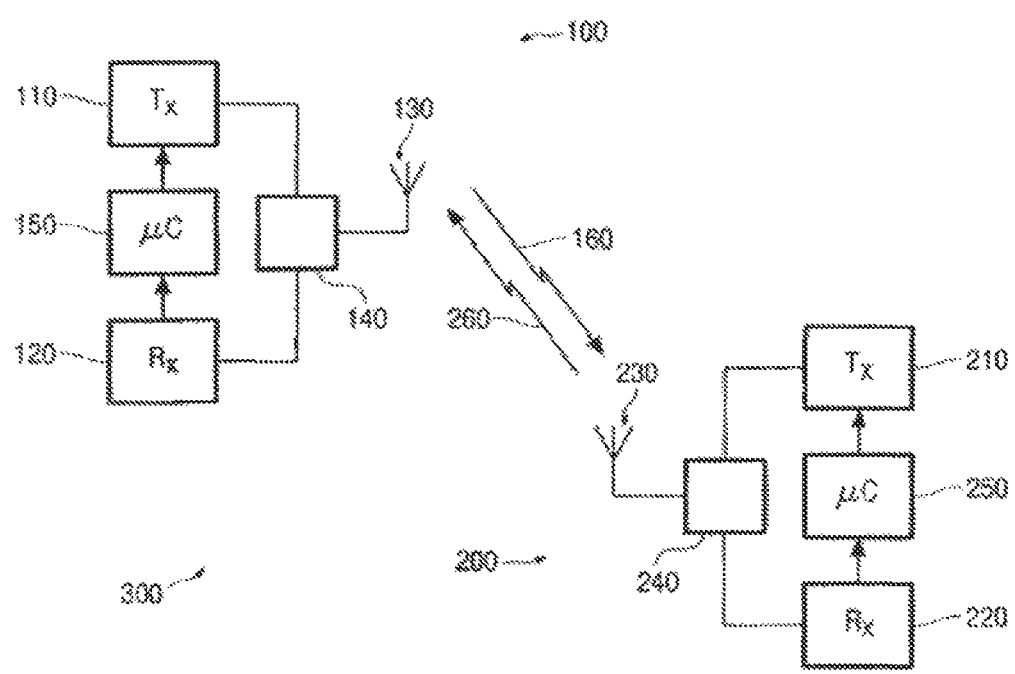
FIG. 1 is a block diagram of a system in which is implemented the invention.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 or an antenna array comprising a plurality of antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 or an antenna array comprising a plurality of antennas, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

Some preferred embodiments of the invention are as follows:

The simplified preamble transmission procedure may comprise one or more of:
  using a larger power step between preambles
  starting with a higher power
  starting with the same power as the last transmission of the previous preamble.

The use or non-use of the simplified preamble transmission procedure may be dependent on one or more of the following:
  the particular preamble selected the first time
  the type of RACH access (for example Release 99 RACH or E-RACH)
  one or more characteristics of the data or transmissions to follow the RACH access.

In a typical embodiment, the invention is applied in UMTS WCDMA.

A detailed embodiment is described below.

In R1-074976, "Enhanced Uplink for CELL_FACH", Philips, available at http://www.3gpp.org/ftp/tsg_ran/WG1_RL1/TSGR1_51/Docs/R1-074976.zip, we discussed a number of issues related to the use of RACH preambles for the initial phase of starting Enhanced Uplink in Cell_FACH. In this paper we focus on the E-DCH resource allocation phase.

Note that in this paper, when we refer to "E-DCH Resource" we mean a combination of an UL scrambling code, E-RNTI, F-DPCH code and time-offset, E-RGCH/E-HICH code and signatures, and E-AGCH code.

E-DCH Resource Allocation Methods

Overview of Possibilities

In general, two extreme possibilities may be identified:

Each E-RACH preamble is directly associated with one E-DCH resource. The E-DCH resource is effectively selected randomly by the UE, and no additional resource allocation signalling is transmitted by the NodeB when acknowledging the preamble. If the E-DCH resource corresponding to the preamble selected by the UE is already in use, the NodeB responds to the preamble with a NACK on the AICH.

There is no predetermined association between E-RACH preambles and E-DCH resources. The allocation of E-DCH resources is carried out by the eNodeB and signalled in response to an E-RACH preamble.

Intermediate cases are also possible, where an association exists between each E-RACH preamble and a set of E-DCH resources. When the UE selects a preamble it therefore also selects a corresponding set of E-DCH resources, and the particular E-DCH resource within that set is selected by the NodeB and signalled in response to the preamble.

As discussed in R1-074976, in all cases the total set of E-DCH resources available should be broadcast, so that any signalling by the NodeB can simply comprise an index.

E-DCH Resource Allocation Signalling

The main factor governing which of the above methods should be used depends on how many signalling bits can be transmitted when the NodeB responds to an E-RACH preamble.

If no bits are available (i.e. the NodeB simply sends a conventional AICH response with no extension), then option (1) (each E-RACH preamble directly associated with one E-DCH resource) should be used. However, in our view, the set-up delay associated with option (1) is likely to be too long. This is because the collision probability becomes limited by the number of E-DCH resources available, not the number of E-RACH preambles available. Whenever a UE happens to select a preamble corresponding to an E-DCH resource which is already in use, it has to start again with random preamble selection.

Therefore possibilities for reducing the delay of option (1) might be considered, for example:
  use the reserved part at the end of the AICH to broadcast the indices of the E-DCH resources which are not yet in use, so that the UE can select a corresponding E-RACH preamble, and/or
  shorten the power ramping phase. For example by omitting the power-ramping phase of the RACH for a subsequent access attempt if the UE's first preamble transmission of the previous attempt is NACK'ed. (If the UE has already established a power level at which its first preamble was acknowledged, it introduces unnecessary delay if the UE has to start with a lower power level when selecting a different preamble. The process could be speeded up by allowing the UE to use the same power level as for the previous NACK'ed preamble.)

However, in practice it seems entirely possible to transmit a few additional signalling bits together with the AICH response. Possible methods for this include:

using certain existing AICH signatures, or groups of simultaneously-transmitted signatures, to allocate E-DCH resources, as proposed in R1-074303, "Resource assignment for E-DCH access in CELL_FACH state" Nokia Corporation, Nokia Siemens Networks, available at http://www.3gpp.org/ftp/tsg_ran/WG1_RL1/TSGR1_50b/Docs/R1-074303.zip.

extending the number of available AICH signatures, and using them for signalling, as also proposed in R1-074303.

signalling using the reserved part at the end of the AICH.

Method (1) used on its own without extending the information-carrying ability of the AICH reduces the number of signatures available for access requests and therefore results in an increased collision probability. Therefore we do not prefer such a solution.

The number of bits available with each of methods (2) and (3) needs further evaluation. In principle, 16 additional signatures are available with method (2), although this would generate some additional interference to existing R99 AICH responses which needs to be evaluated. The number of bits available with method (3) is more limited (8 bits with SF256), but does not cause interference to existing AICH responses.

The amount of interference could be reduced in a default resource is indicated by sending only an ACK on the AICH, and in case this resource is not available, another may be indicated by sending additional signalling bits.

Both of these methods 2) and 3) (or even a combination of the two) should be evaluated further.

If the E-DCH resource allocation is indicated entirely by the choice of E-RACH preamble then methods for reducing the delay might be considered, for example: use the reserved part at the end of the AICH to broadcast the indices of the E-DCH resources which are not yet in use, so that the UE can select a corresponding E-RACH preamble, shorten the power ramping phase.

If additional signalling bits are used to indicate the E-DCH resource allocation, we propose to transmit a few additional signalling bits together with the AICH response. Possible methods for this include:

extending the number of available AICH signatures, and using them for signalling, as also proposed in R1-074303.

signalling using the reserved part at the end of the AICH

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

The invention claimed is:

1. A method of operating a secondary station for requesting that a primary station grant to the secondary station, access to a resource, the method comprising:
   in a secondary station:
   a processor of the secondary station transmitting via a transmitter and antenna to a primary station a first access preamble to request access to a resource,
   upon a first indication of one or more failures of reception by the primary station of the first access preamble, the processor of the secondary station starting a first transmission improvement scheme for successively transmitting one or more times, in a first access slot, via the transmitter and antenna, the first access preamble with successive transmissions increased in transmission power by a predetermined first power level step increase,
   upon a second indication of one or more failures of reception of the first access preamble with the first transmission improvement scheme at the primary station, the processor of the secondary station terminating the first transmission improvement scheme and starting a second transmission improvement scheme for successively transmitting one or more times, in a second access slot, via the transmitter and antenna, a second access preamble to request access to the resource from the primary station, the second access preamble being different from the first access preamble, and the second access slot being different from the first access slot used for transmission of the first access preamble.

2. The method of claim 1, wherein the first transmission improving scheme comprises starting from a first initial transmission power level, and wherein the second transmission improving scheme comprises starting from a second initial transmission power level being higher than the first initial transmission power level.

3. The method of claim 2, wherein the second initial transmission power level equals the power level of the highest transmission power according to the first transmission improvement scheme.

4. The method of claim 1, wherein the use or non-use of the second transmission improving scheme depends on at least one factor of the following group:
   a signaled instruction from the primary station;
   the first access preamble;
   the type of access request;
   the type of resource for which access is requested;
   one or more characteristics of the data or transmissions to follow access request; or
   a combination of the preceding factors.

5. The method of claim 4, wherein at least one factor determining the use or non-use of the second transmission improving scheme is signaled to the secondary station by the primary station.

6. A secondary station, comprising:
   a processor configured to:
   transmit via a transmitter and antenna, a first access preamble to a primary station to request access to a resource,
   the processor configured to:
   upon a first indication of one or more failures of reception of the first access preamble, at the primary station, start a first transmission improvement scheme for successively transmitting one or more times, in a first access slot, via the transmitter and antenna, the first access preamble with a transmission power with a first initial power level successively increased by a predetermined first power level step increase, and,
   upon a second indication of one or more failures of reception of the first access preamble with the first transmission improvement scheme, terminating the first transmission improvement scheme and starting a second transmission improvement scheme for successively transmitting one or more times via the transmitter and antenna, a second access preamble that is different than the first access preamble, wherein the second transmission improvement scheme comprises transmission in a second access slot different from the first access slot used for transmission of the first access preamble.

7. The secondary station of claim 6, wherein the first transmission improvement scheme comprises starting from a predetermined first initial transmission power level and increasing transmission power level in successive step increases, and wherein the second transmission improvement scheme comprises starting from a different second initial transmission power level being higher than the first initial transmission power level and increasing transmission power level in successive step increases.

8. The secondary station of claim 7, wherein the second transmission initial power level of the second transmission improving scheme equals the highest transmission power level according to the first transmission improving scheme.

9. The secondary station of claim 6, wherein the use or non-use of the second transmission improving scheme depends on at least one factor of the following group:
   a signaled instruction from the primary station;
   the first access preamble;
   the type of access request;
   the type of resource for which access is requested;
   one or more characteristics of the data or transmissions to follow access request; or
   a combination of the preceding factors.

10. The secondary station of claim 9, wherein at least one factor determining the use or non-use of the second transmission improving scheme is signaled to the secondary station by the primary station.

11. The secondary station of claim 6, wherein the first indication of failure is at least one indication of the group of:
    failure to receive an acknowledgement within a predetermined time;
    receiving a negative acknowledgement;
    receiving an indication to reconfigure power ramping schemes; or
    a combination of the previous indications.

12. A secondary station for use in a network of one or more primary and multiple secondary stations, the secondary station comprising:
one or more antennas,
a coupler connected to the one or more antennas to, at alternate times, rout transmissions to the antennas and rout receptions from the antennas,
a transmitter with an input and an output, the output being connected to the coupler to transmit the transmissions,
a receiver with an output and an input, the input being connected to the coupler to receive the receptions, and
a processor connected to the input of the transmitter and the output of the receiver to control the transmitter and the receiver for communicating with the primary station, and
wherein the processor of the secondary station transmits via the transmitter and antenna, a first access preamble to a primary station, and upon a first indication of one or more failures of reception of the first access preamble, the secondary station starting a first transmission improving scheme for successive transmission, one or more times, in a first access slot, via the transmitter and antenna, of the first access preamble, the first transmission improvement scheme comprises a first predetermined initial transmission power level, subsequently increased by a first predetermined transmission power level step increases, and upon a second indication of one or more failures of reception of the first access preamble with the first transmission improving scheme, terminating the first transmission improving scheme, and starting a second transmission improving scheme, being different from the first transmission improving scheme, wherein the second transmission improving scheme comprises transmission one or more times, in a second access slot, via the transmitter and antenna, of a second access preamble in a second access slot different from the first access slot used for transmission of the first access preamble.

13. The secondary station of claim 12, wherein the first transmission improving scheme comprises starting from a first initial transmission power level, and wherein the second transmission improving scheme comprises starting from a second initial transmission power level being higher than the first initial transmission power level.

14. The secondary station of claim 13, wherein the second initial transmission power level equals the highest transmission power level according to the first transmission improving scheme.

15. The secondary station of claim 12, wherein the use or non-use of the second transmission improving scheme depends on at least one factor of the following group:
a signaled instruction from the primary station;
the first access preamble;
the type of access request;
the type of resource for which access is requested;
one or more characteristics of the data or transmissions to follow access request; or
a combination of the preceding factors.

16. The secondary station of claim 15, wherein at least one factor determining the use or non-use of the second transmission improving scheme is signaled to the secondary station by the primary station.

17. The secondary station of claim 12, wherein the second access preamble is different than the first access preamble.

18. A tangible computer-readable storage-medium that is not a transitory propagating signal or wave, the medium modified by control information including instructions for performing a method in a secondary station for communicating in a network with a primary station for requesting that the primary station grant to the secondary station, access to a resource, the method comprising:
in a secondary station:
a processor of the secondary station transmitting via a transmitter and antenna, to a primary station an access preamble to request access to a resource,
upon a first indication of one or more failures of reception by the primary station of the access preamble, the processor of the secondary station starting a first transmission improvement scheme for successively transmitting one or more times, in a first access slot, via the transmitter and antenna, the first access preamble with successive transmissions increased in power by a predetermined first transmission power step increase,
upon a second indication of one or more failures of reception of the first access preamble with the first transmission improvement scheme at the primary station, the secondary station terminating the first transmission improvement scheme and starting a second transmission improvement scheme for successively transmitting one or more times, in a second access slot, a second access preamble, to request a grant of access to the resource, from the primary station, the second access preamble being different from the first access preamble, and the second access slot is different from the first access slot used for transmission of the first access preamble.

19. A primary station comprising:
a processor configured to:
receive via an antenna and a receiver from a secondary station, a first access preamble to request access to a resource;
transmit via a transmitter and the antenna to the secondary station, an acknowledgement of receipt depending on a correct access preamble to request access to the resource, being received;
transmit via the transmitter and antenna to the secondary station, a negative acknowledgement of the receipt depending on an incorrect access preamble to request access to the resource, being received;
transmit via the transmitter and antenna to the secondary station, a first indication to begin using a first transmission improving scheme depending on an incorrect access preamble to request access to the resource, being received, the first transmission improving scheme for successively transmitting one or more times, in a first access slot, the first access preamble with successive transmissions increased in transmission power by a predetermined first power level step increase,
transmit via the transmitter and antenna to the secondary station, a second indication to reconfigure transmission improving schemes from the first transmission improving scheme to a second transmission improving scheme depending on an incorrect first access preamble to request access to the resource, being received, the second indication to reconfigure transmission improving schemes is different from a lack of acknowledgement or a negative acknowledgement, the second transmission improving scheme for successively transmitting one or more times, in a second access slot, a second access preamble, the second access preamble being different from the first access preamble, and the second access slot is different from the first access slot, transmit via the transmitter and antenna, to the secondary station, an indication of a grant of access to the resource, depending on the receipt of the correct access preamble to request access to the resource.

20. A method of operating a primary station for granting access to a resource to a secondary station, the method comprising:

in a primary station:
a processor of the primary station:
receiving via a receiver and antenna from a secondary station an access preamble to request access to a resource;
transmitting via a transmitter and the antenna to the secondary station, an acknowledgement of receipt, depending on a correct access preamble to request access to the resource, being received;
transmitting via the transmitter and antenna to the secondary station, a negative acknowledgement of the receipt, depending on an incorrect access preamble to request the resource, being received;
transmitting via the transmitter and antenna to the secondary station, a first indication to begin using a first transmission improving scheme, depending on an incorrect access preamble to request access to the resource, being received; the first transmission improving scheme for successively transmitting one or more times, in a first access slot, the first access preamble with successive transmissions increased in transmission power by a predetermined first power level step increase,
transmitting via the transmitter and antenna to the secondary station, a second indication to reconfigure transmission improving schemes from the first transmission improving scheme to a second transmission improving scheme, depending on an incorrect access preamble to request access to the resource, being received, the second indication to reconfigure transmission improving schemes is different from the lack of acknowledgement or the negative acknowledgement; the second transmission improving scheme for successively transmitting one or more times, in a second access slot, a second access preamble, the second access preamble being different from the first access preamble, and the second access slot is different from the first access slot, the second transmission improving scheme being different from the first transmission improving scheme, and
transmitting via the transmitter and antenna, to the secondary station, an indication of a grant of access to the resource, depending on the receipt of the correct access preamble to request access to the resource.

21. A tangible computer-readable storage-medium that is not a transitory propagating signal or wave, the medium modified by control information including instructions for performing a method of operating a primary station for granting access to a resource to a secondary station, the method comprising:

in a primary station:
a processor of the primary station:
receiving via a receiver and antenna from a secondary station an access preamble to request access to a resource;
transmitting via a transmitter and the antenna to the secondary station, an acknowledgement of receipt, depending on a correct access preamble to request access to the resource, being received;
transmitting via the transmitter and antenna to the secondary station, a negative acknowledgement of the receipt, depending on an incorrect access preamble to request the resource, being received;
transmitting via the transmitter and antenna to the secondary station, a first indication to begin using a first transmission improving scheme, depending on an incorrect access preamble to request access to the resource, being received; the first transmission improving scheme for successively transmitting one or more times, in a first access slot, the first access preamble with successive transmissions increased in transmission power by a predetermined first power level step increase,
transmitting via the transmitter and antenna to the secondary station, a second indication to reconfigure transmission improving schemes from the first transmission improving scheme to a second transmission improving scheme, depending on an incorrect access preamble to request access to the resource, being received, the second indication to reconfigure transmission improving schemes is different from the lack of acknowledgement or the negative acknowledgement; the second transmission improving scheme for successively transmitting one or more times, in a second access slot, a second access preamble, the second access preamble being different from the first access preamble, and the second access slot is different from the first access slot, the second transmission improving scheme being different from the first transmission improving scheme, and
transmitting via the transmitter and antenna, to the secondary station, an indication of a grant of access to the resource, depending on the receipt of the correct access preamble to request access to the resource.

* * * * *